H. M. DUDLEY.
FIBER TREATING MACHINE.
APPLICATION FILED DEC. 4, 1918.

1,328,987.

Patented Jan. 27, 1920.
10 SHEETS—SHEET 2.

Inventor
Howard M. Dudley
By his Attorney

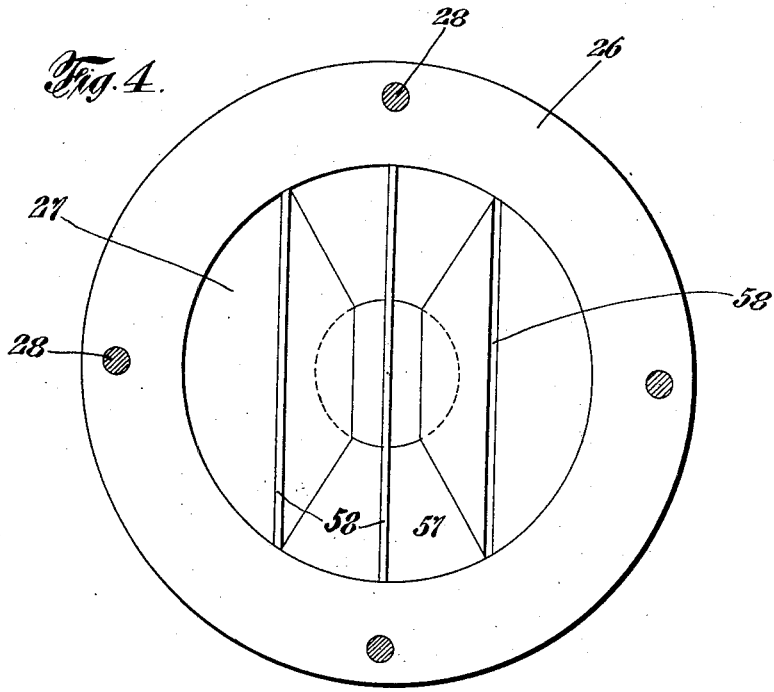

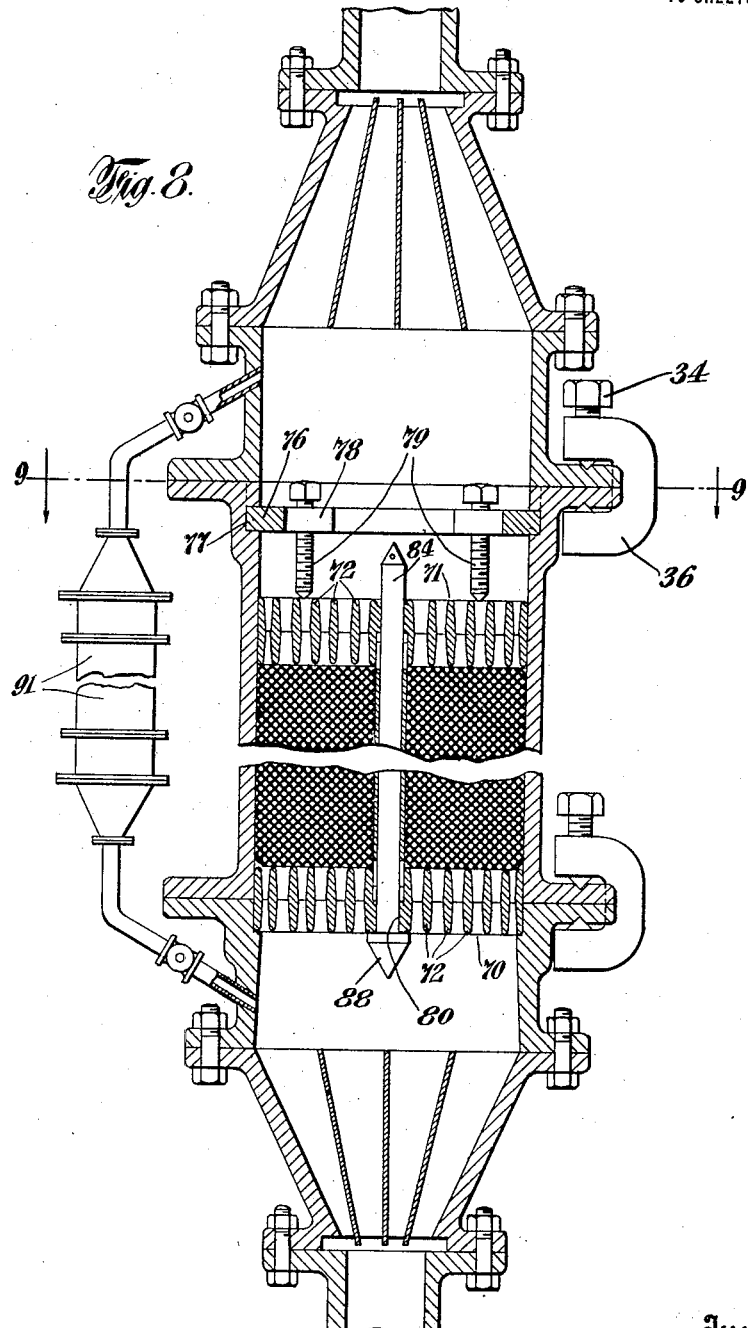

H. M. DUDLEY.
FIBER TREATING MACHINE.
APPLICATION FILED DEC. 4, 1918.
1,328,987.
Patented Jan. 27, 1920.
10 SHEETS—SHEET 5.
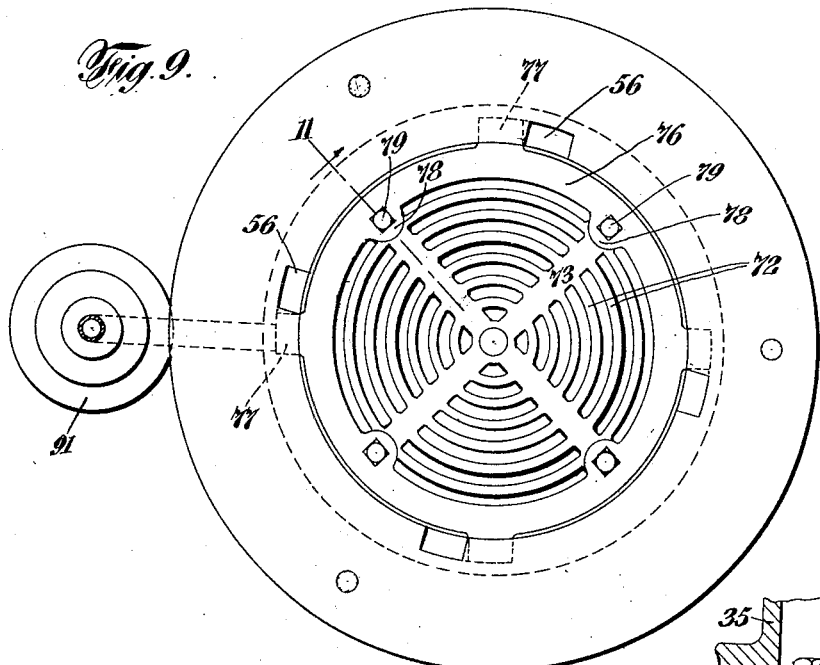
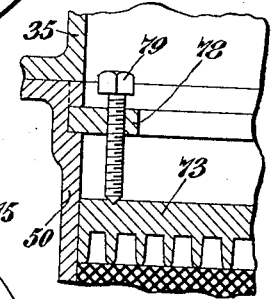
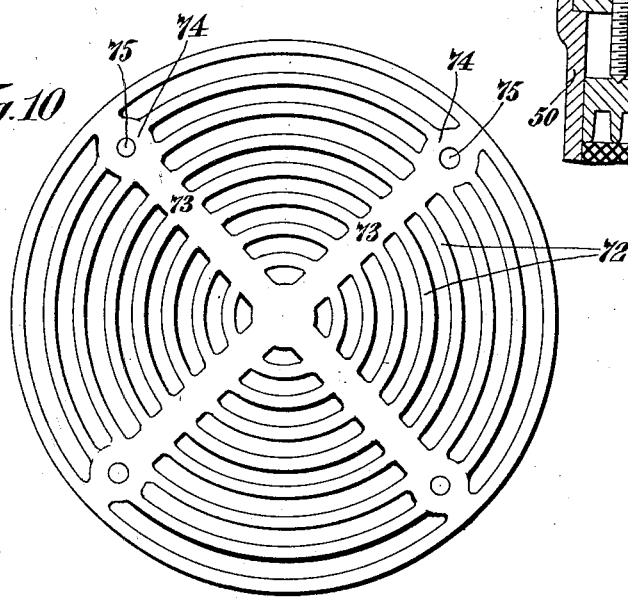

H. M. DUDLEY.
FIBER TREATING MACHINE.
APPLICATION FILED DEC. 4, 1918.
1,328,987.
Patented Jan. 27, 1920.
10 SHEETS—SHEET 6.
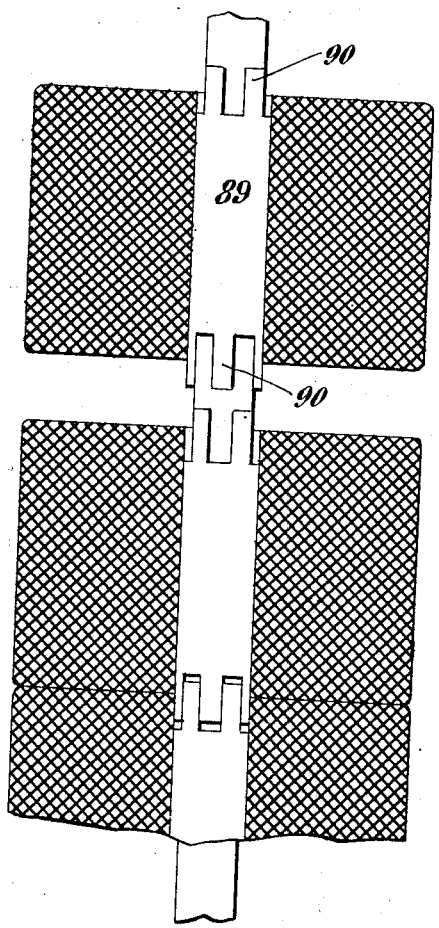
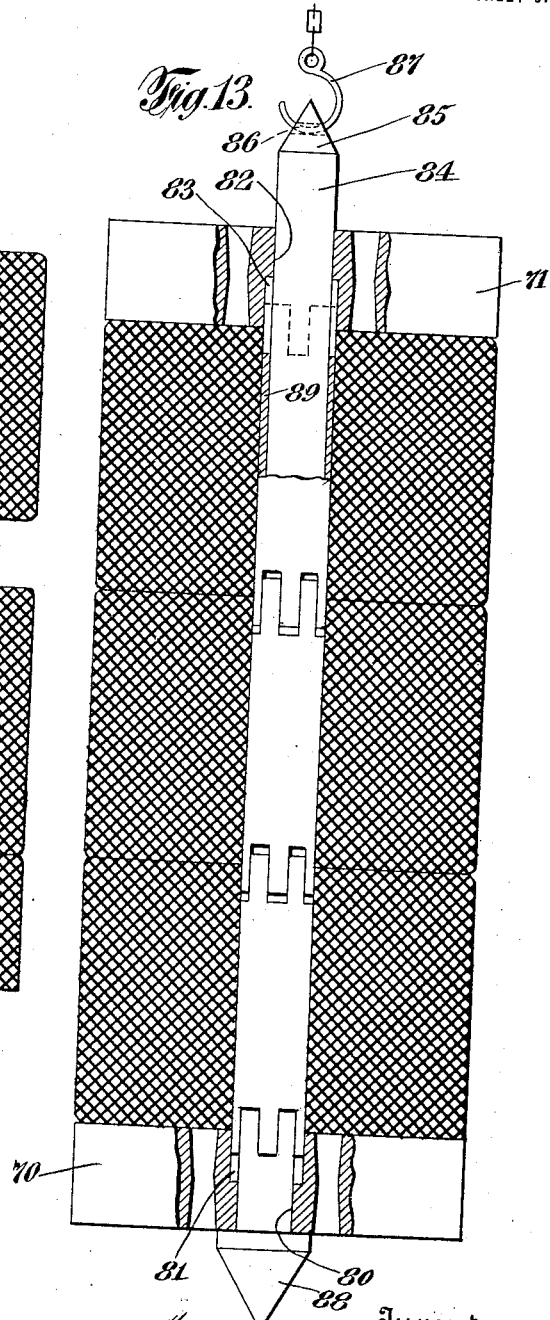

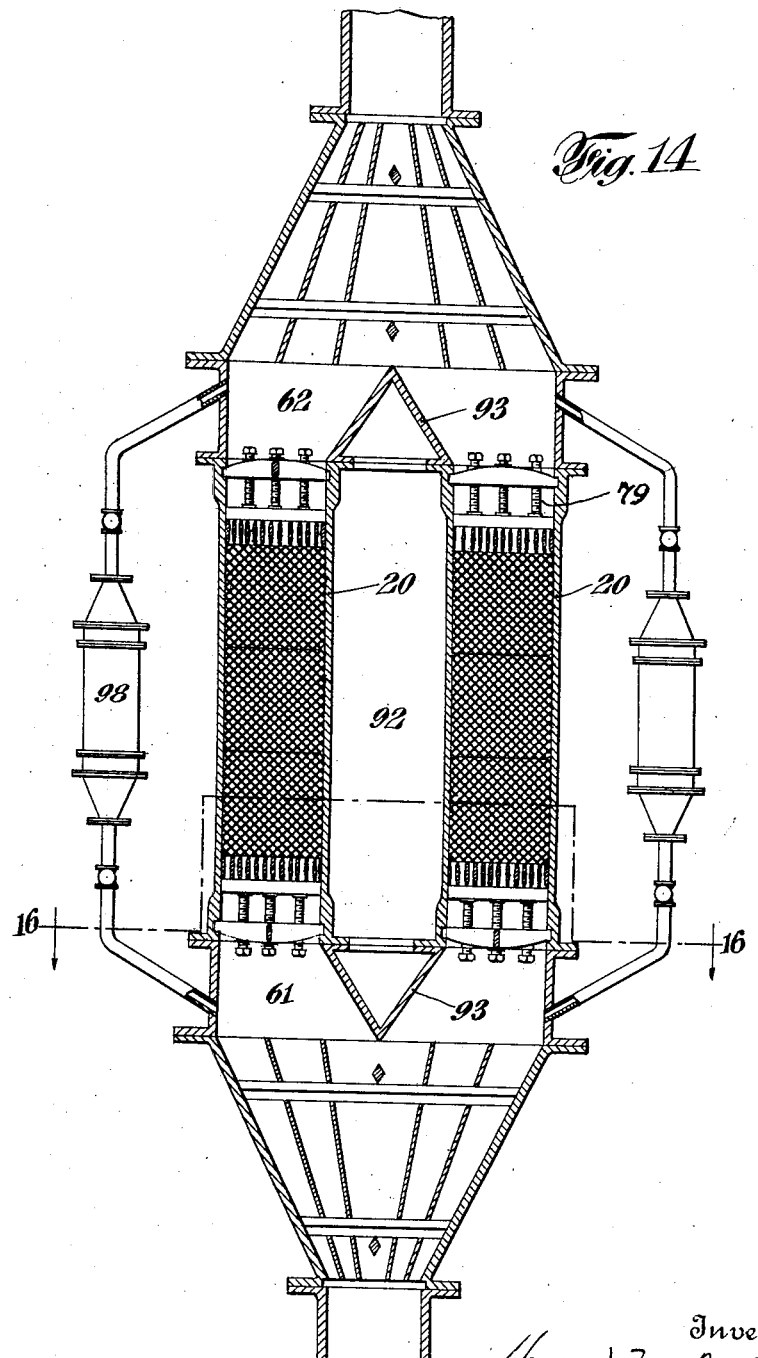

H. M. DUDLEY.
FIBER TREATING MACHINE.
APPLICATION FILED DEC. 4, 1918.
1,328,987.
Patented Jan. 27, 1920.
10 SHEETS—SHEET 8.
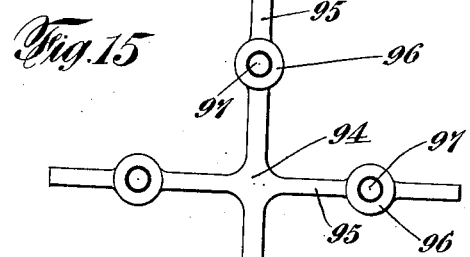
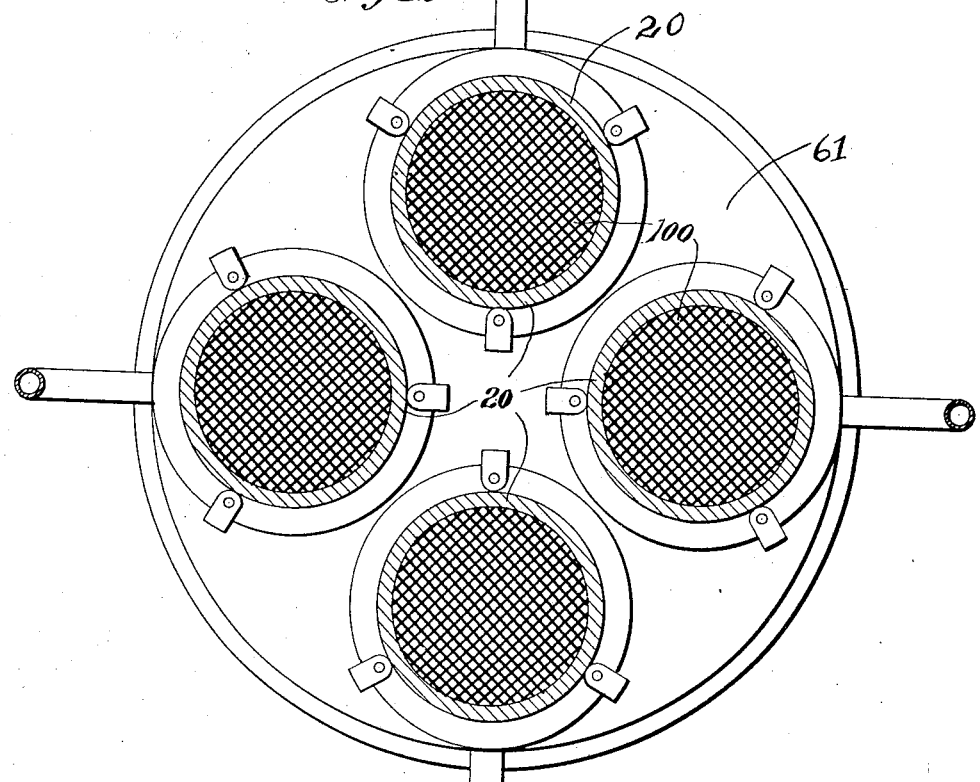

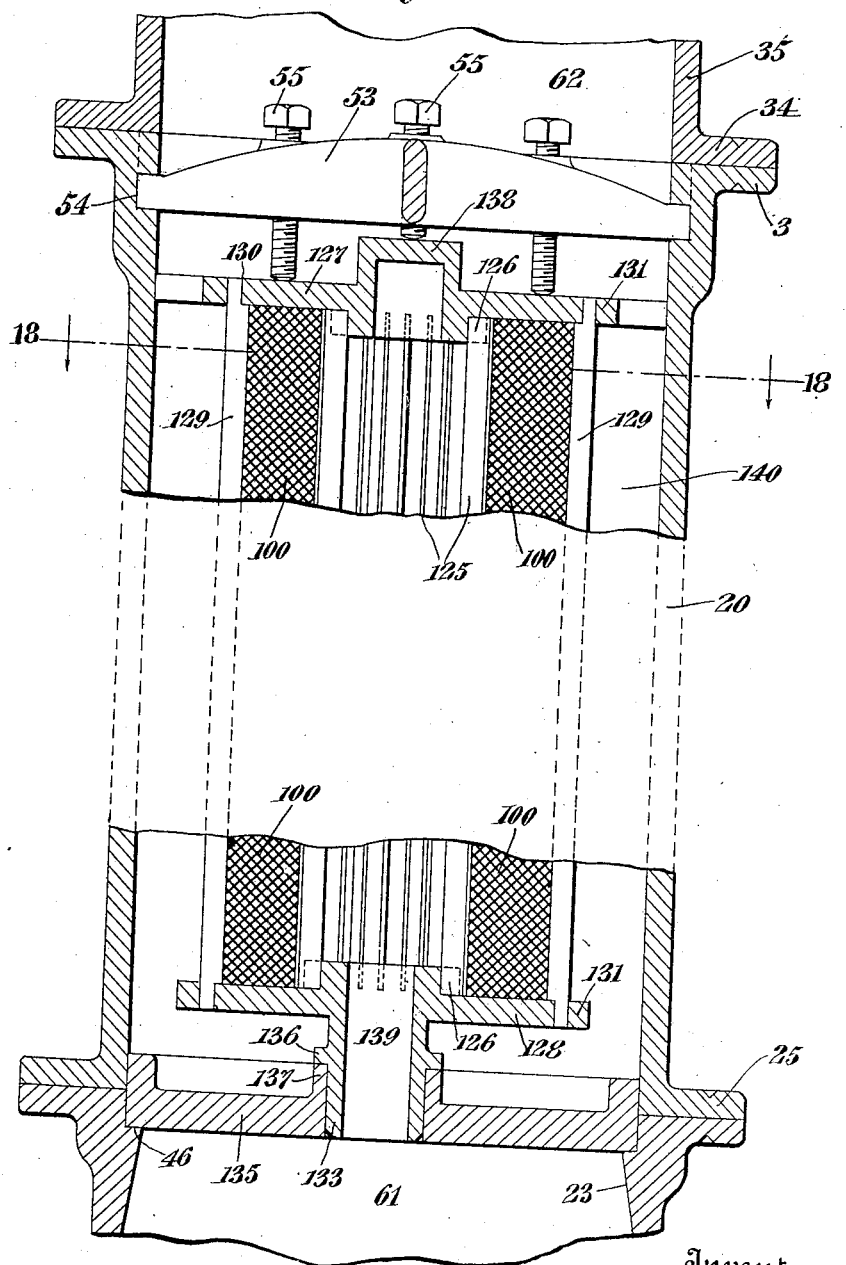

H. M. DUDLEY.
FIBER TREATING MACHINE.
APPLICATION FILED DEC. 4, 1918.

1,328,987.

Patented Jan. 27, 1920.
10 SHEETS—SHEET 10.

UNITED STATES PATENT OFFICE.

HOWARD M. DUDLEY, OF PHILADELPHIA, PENNSYLVANIA.

FIBER-TREATING MACHINE.

1,328,987.  Specification of Letters Patent.  Patented Jan. 27, 1920.

Application filed December 4, 1918. Serial No. 265,212.

*To all whom it may concern:*

Be it known that I, HOWARD M. DUDLEY, a citizen of the United States, and a resident of Philadelphia, in the county of Philadelphia and State of Pennsylvania, have invented certain new and useful Improvements in Fiber-Treating Machines, of which the following is a full, clear, and exact specification.

My invention relates to fiber treating machines and refers particularly to those suitable for the treatment of different classes of fiber masses.

One object of my invention is a machine in which textile fibers and fabrics of various kinds may be treated and dyed.

Another object of my invention is a device in which textile fibers and fabrics in the condition of loose fiber, warps, balls, tops, cops, beams, piece goods and other textile forms may be treated and dyed equally and evenly while the fiber is under pressure.

Another object of my invention is a device in which the contained air may be readily removed by the flow of the liquid, thus insuring a more complete penetration of the fiber.

These and other objects of my invention will be evident upon a consideration of the drawings, specification and claims forming a part of this application.

In the production of textile fabrics, the fiber is produced in a great number of forms, such as: loose fiber, solid balls, warps, wound balls, cops, beams, piece goods, etc., depending upon the conditions of production and the character of the goods to be produced.

It is some times much more advantageous to dye and treat the fiber in one condition than it is to dye and treat it in another condition, and hence a device which can be used for the treating and dyeing of all kinds of fiber forms, fiber masses and fiber fabrics is most desirable and valuable.

In the use of the present employed devices a number of machines must be used for this purpose as none of them is adaptable for all classes of dyeing.

I have overcome all of the difficulties incident to the use of a number of machines by incorporating in my device an arrangement of parts and a construction of a machine whereby one machine is suitable for the treating and dyeing of all of the above described fiber forms.

In the accompanying drawings, illustrating several modifications of my device, similar parts are designated by similar numerals:—

Fig. 4 is a section through the line 4—4 of Fig. 1.

Fig. 5 is a top plan view of one of the followers.

Fig. 6 is a top plan view of one of the foraminous plates.

Fig. 7 is a cross-section showing a bayonet joint arrangement.

Fig. 8 is a vertical cross-section of my device adapted for the dyeing of hollow core fiber forms.

Fig. 9 is a section through the line 9—9 of Fig. 8.

Fig. 10 is a top plan view of one of the foraminous plates of Fig. 8.

Fig. 11 is a broken cross-section showing the bayonet joint arrangement of Fig. 8.

Fig. 12 is an enlarged broken section of the core members of Fig. 8 in a separated position.

Fig. 13 is an enlarged section of the core members of Fig. 8 showing the interlocking members.

Fig. 14 is a vertical cross-section of a modification of my device.

Fig. 15 is a top plan view of the follower of Fig. 14.

Fig. 16 is a section through the line 16—16 of Fig. 14.

Fig. 17 is a vertical cross-section of my device adapted to the dyeing of beams, etc.

Figure 1:
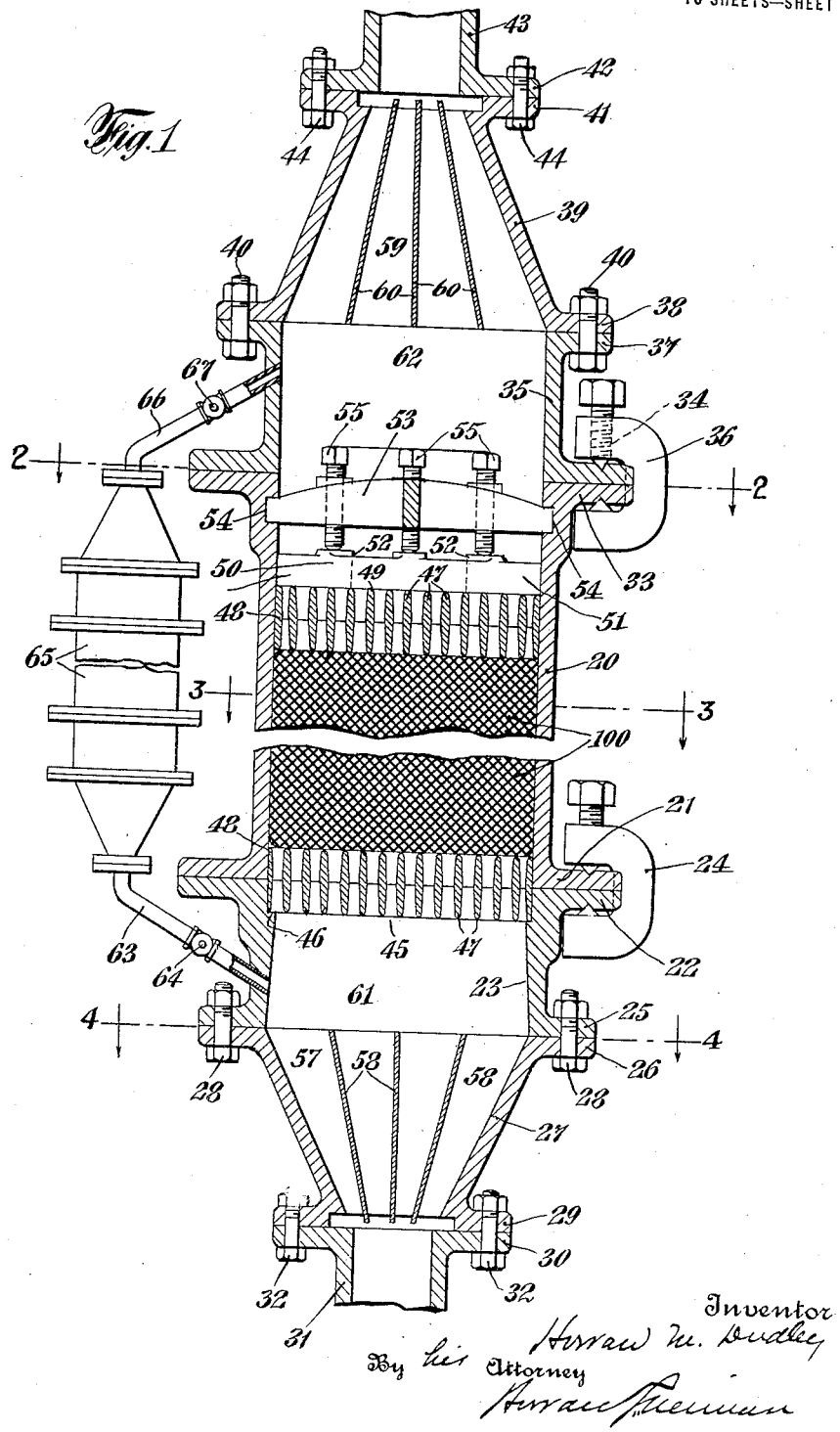
Figure 1 is a vertical cross-section of one form of my device.
Figure 2:
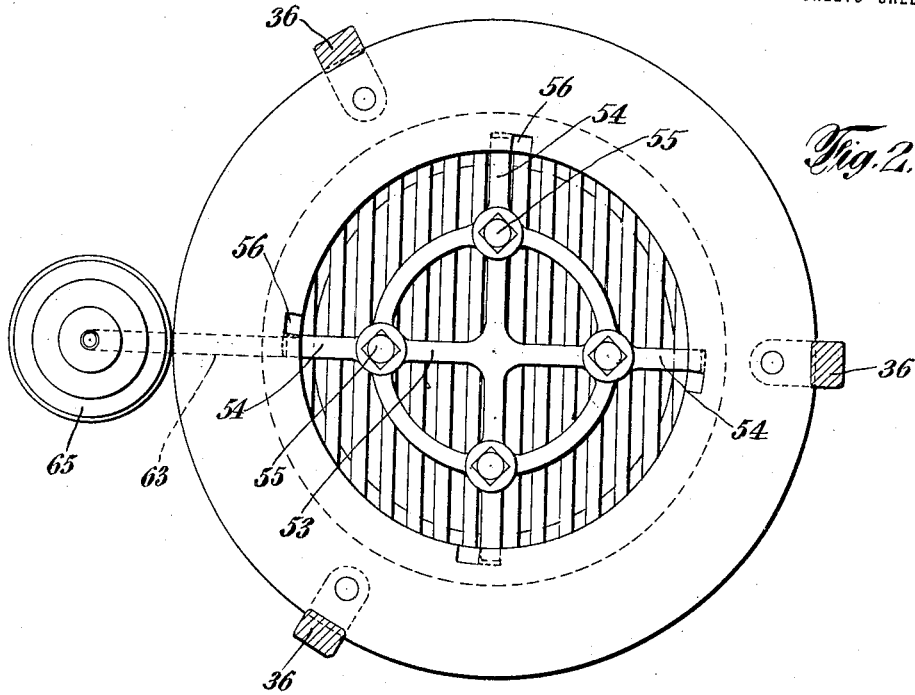
Fig. 2 is a section through the line 2—2 of Fig. 1.
Figure 3:
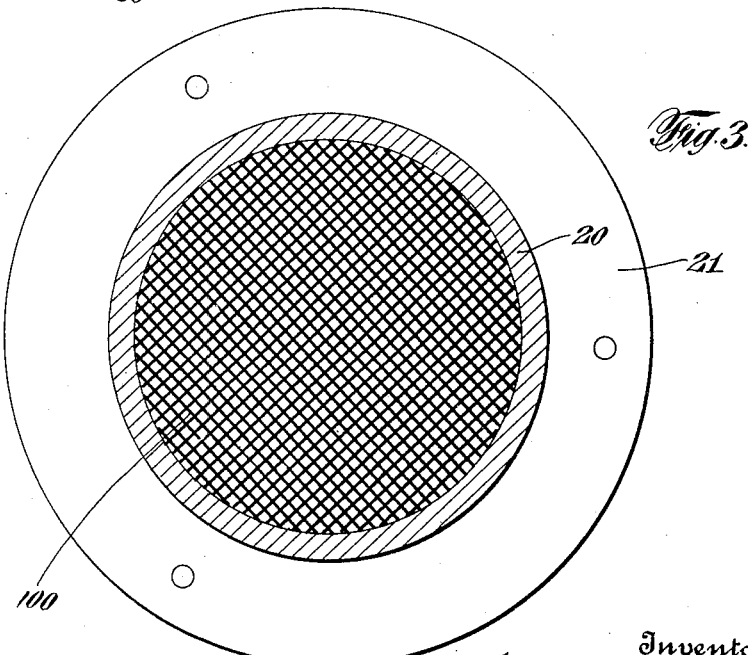
Fig. 3 is a section through the line 3—3 of Fig. 1.

The particular form of my device shown in the accompanying drawings, Figs. 1 to 7 inclusive, comprises a hollow cylindrical member, or dyeing chamber 20, the lower flange 21 of which is attached to the flange 22 of the hollow cylindrical member 23 by the clamps 24, 24. The lower flange 25 of the member 23 is attached to the flange 26 of the hollow conical member 27 by the bolts 28, 28, and the flange 29 of the member 27 is attached by means of the bolts 32, 32 to the flange 30 of the pipe 31, which is connected to a source of liquid supply. The upper flange 33 of the dyeing chamber 20 is connected to the flange 34 of the hollow cylindrical member 35 of the clamps 36, 36. The flange 37 of the member 35 is connected to the flange 38 of the hollow cylindrical member 39 by means of the bolts 40, 40. The flange 41 of the member 39 is connected to the flange 42 of the pipe 43 by means of the bolts 44, 44. The pipe 43 is connected with a source of liquid supply. A foraminous plate 45 rests upon the annular projection 46 of the member 23. The plate 45 consists of a series of spaced parallel upwardly and downwardly converging bars 47, 47 carried by the annular member 48. Abuttable upon the annular member 48 of the plate 49 is a spider follower 50 having the projecting arms 51, 51 abuttable upon the member 48 and also has the members 52, 52. A second spider 53 has the extended arms 54, 54 and a series of screw bolts 55, 55 extending through the spider 53 and threaded therein. The lower ends of the bolts 55, 55 are abuttable upon the members 52, 52 of the spider follower 50. Situated within the wall of the dyeing chamber 20 is a series of bayonet joint recesses 56, 56 allowing the introduction of the arms 54, 54 of the spider 53, a revoluble movement of the spider 53 locking it to the walls of the dyeing chamber 20. The chamber 57 of the member 27 has a series of spaced downwardly converging plates 58, 58 extending transversely of the same. The chamber 59 of the member 39 has a series of similar upwardly converging plates 60, 60.

A pipe 63, carrying the valve 64, connects the chamber 61 with the bottom of a testing device 65, similar and proportionate to the larger device, and a pipe 66, carrying the valve 67 connects the chamber 62 with the top of the testing device 65.

The operation of the device shown in Figs. 1 to 7 inclusive is as follows:—

The plate 45 is placed upon the projection 46, the loose fiber 100, or solid fiber forms, is placed upon the plate 45, the plate 49 is placed upon the fiber, the spider is placed upon the plate 49 and the spider 53 is locked within the bayonet joints 56, 56, with the lower ends of the screw bolts 55, 55 abutting upon the members 52, 52 of the spider follower 50. The bolts 55, 55 are then screwed down, forcing the spider follower 50 and the plate 49 downwardly compressing the fiber 100. When the proper compression is obtained, the upper members are replaced connecting the device with a source of liquid supply through the pipe 43. The testing device 65 is removed, loaded in a similar manner and the valves 64 and 67 are opened. If the liquid is forced upwardly it passes through the pipe 31, between the distributing members 58, 58 of the chamber 57, the compressed fiber, the plate 49, the spiders 50 and 53 and chambers 62 and 59 and the pipe 43 for continuous circulation. The liquid may be caused to take a reverse flow by passing it downwardly through the pipe 43. During these operations the liquid flows similarly through the testing device 65. If it is desired at any time to determine the condition of the fiber in the larger device, the valves 64 and 67 are closed, the testing device 65 removed and the contents examined without disturbing the fiber in the large device or interrupting the operation.

The device as shown in Figs. 8 to 13 inclusive, adapted for the dyeing of hollow core members contains a bottom plate 70, and a similar top plate 71 comprising a series of concentric annular spaced upwardly and downwardly converging members 72, 72 supported by the supporting members 73, 73, the supporting members 73, 73 of the top plate having the extended portions 74, 74 with conical recesses 75, 75. The annular member 76 has a series of extended arms 77, 77 capable of being introduced into, and locked within the bayonet joint 56. The member 76 also has a series of inwardly extending projections 78, 78 each carrying a threaded hole through which the screw bolts 79, 79 pass and are meshed. The lower ends of the bolts 79, 79 are of conical shape and fit within the recesses 75, 75 of the members 74, 74.

The foraminous plate 70 has a centrally located annular opening 80 with an annular offset 81. The foraminous plate 71 has a centrally located annular opening 82 with an annular offset 83. The removable cylindrical elongated core 84 has an upper conical shaped end 85, with an opening 86 for the insertion of a hook 87 for removing the core. The lower end 88 of the core 84 is of a conical shape.

In using the device for the dyeing of hollow fiber forms, the fiber 100 is wound upon a series of hollow cylindrical members 89, 89 capable of abutment upon and slidable over the cores 84, 84. These members 89, 89 are composed advantageously of thin metal and have notched, or indented, ends 90, 90, the extended ends being capable of slidably entering the indents of the adjacent members. Fig. 12 shows these members 89, 89 in separate position, while Fig. 13 shows them in placed position one against the other. The upper extended members 90, 90 of the upper member 89 fit within the indent 83, of the plate 71, abutting upon the core 84 and the side of the plate 71 forming a tight joint therewith, while the lower extended members 90, 90 of the lower member 89 enter the indent 81, of the plate 70 forming a similar tight joint. When the core 84 is inserted and the fiber-wound members 89, 89 are introduced into the device, the plate 71 is inserted, the spider 76 is locked within the bayonet joints 56, 56 and the screw bolts 79, 79 screwed inwardly compressing the fiber. The testing device 91 is similar and proportionate to the larger device. The dyeing operation is then conducted as described above.

The modification of my device as shown in Figs. 14, 15 and 16 comprises a series of dyeing chambers 20, 20, the lower portions of which open into the chamber 61 and the upper portions of which open into the chamber 62, the central opening 92 being closed at the ends by the conical members 93, 93. The follower 94 comprises the arms 95, 95 having the extended portions 96, 96, with the conical recesses 97, 97 for receiving the ends of the screw bolts 79, 79. The testing devices 98, 98 are similar and proportionate to one of the dyeing chambers of the larger devices with its containing and connecting members. The dyeing operation is conducted in the same manner as described above.

Figure 18:
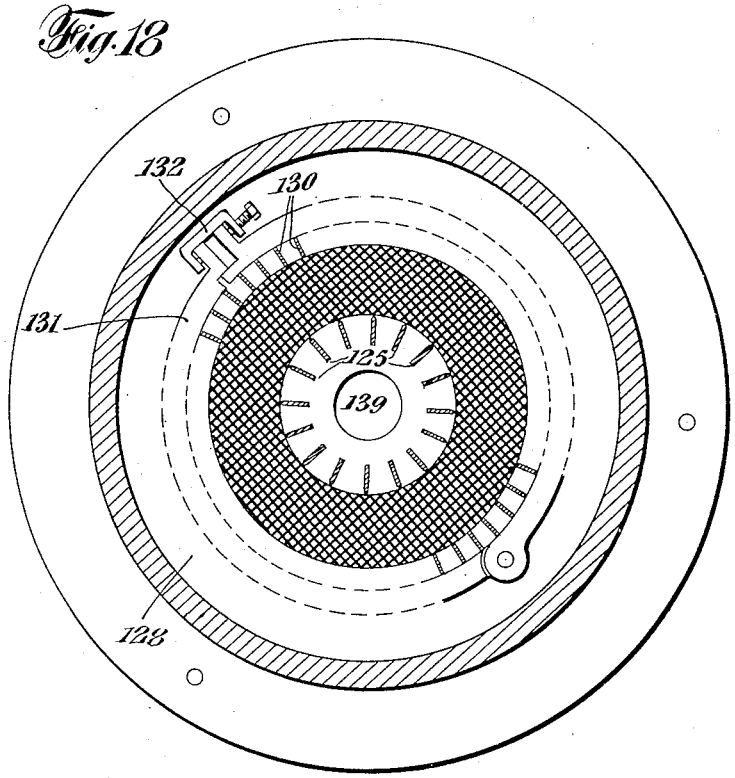
Fig. 18 is a section through the line 18—18 of Fig. 17.
Figure 19:
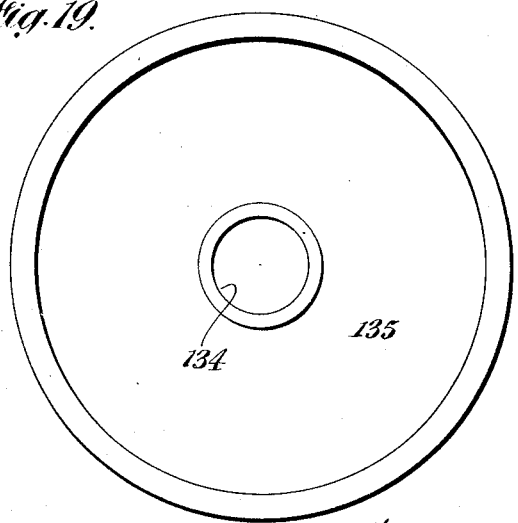
Fig. 19 is a top plan view of the lower plate of Fig. 17.

Figs. 17 to 19 inclusive show my device suitable for the dyeing of beams, jack spools and other similar forms of textile fibers in which the fiber is wound upon hollow central members. The fiber is wound upon a beam comprising a series of spaced parallel members, or bars, 125, 125 within a series of slots, or recesses 126, 126 within the annular head 127 with the extended member 138 and head 128. A series of spaced plates, or bars, 129, 129 are placed within the slots, or recesses, 130, 130 of the heads 127, and 128 and forced inwardly upon the fiber 100 by means of the annular hinged collars 131, 131, which are contracted by means of clamps 132, 132. The hollow extended end 133 of the beam is introduced into the opening 134 of the lower plate 135, the flange 136 of the member 133 resting upon the similar extension 137 of the plate 135. The spider 53 is similar in its construction and means of attachment to the spider 53 of Fig. 1. In the dyeing of beams, jack spools, etc., the liquid is forced upwardly through the chamber 61 and the opening 139 into the hollow center of the beam, thence outwardly between the blades 125, 125, the fiber 100, the blades 129, 129 into the chamber 140 and thence upwardly through the chamber 62 for continuous circulation. If the flow of the liquid is reversed, it passes in reverse direction to that described above.

From the above it will be seen that my device is suitable for the treating and dyeing of all kinds and classes of fibers and fabrics and for determining the condition of the fiber or fabric, without interrupting the treatment operation, hence overcoming the necessity for a number of machines to accomplish these results.

I do not limit myself to the particular size, shape, number or arrangement of parts as described and shown, all of which may be varied without going beyond the scope of my invention as described and claimed.

What I claim is:—

1. In a fiber treating machine, in combination, a fiber chamber, a removable foraminous bottom plate within the fiber chamber, means for supporting the bottom plate, a removable foraminous top plate within the fiber chamber, a spider follower abuttable upon the face of the top plate, means for moving the follower and top plate with respect to the bottom plate and means for forcing a liquid in reverse directions through the device.

2. In a fiber treating machine, in combination, a fiber chamber, a removable foraminous bottom plate comprising a series of spaced parallel bars within the fiber chamber, means for supporting the bottom plate, a removable foraminous top plate within the fiber chamber, a spider follower abuttable upon the top plate, means for moving the follower and top plate with respect to the bottom plate and means for forcing a liquid in reverse directions through the device.

3. In a fiber treating machine, in combination, a fiber chamber, a removable foraminous bottom plate comprising a series of spaced parallel bars within the fiber chamber, means for supporting the bottom plate, a removable foraminous top plate comprising a series of spaced parallel bars within the fiber chamber, a spider follower abuttable upon the top plate, means for moving the follower and top plate with respect to the bottom plate and means for forcing a liquid in reverse directions through the device.

4. In a fiber treating machine, in combination, a fiber chamber, a removable foraminous bottom plate within the fiber chamber, means for supporting the bottom plate, a removable foraminous top plate within the fiber chamber, a spider follower abuttable upon the top plate, a spider carrying a series of threaded members abuttable upon the follower whereby the follower and the top plate may be moved with respect to the bottom plate and means for forcing a liquid in reverse directions through the device.

5. In a fiber treating machine, in combination, a fiber chamber, a removable foraminous bottom plate comprising a series of spaced parallel bars within the fiber chamber, means for supporting the bottom plate, a removable foraminous top plate within the fiber chamber, a spider follower abuttable upon the top plate, a spider carrying a series of threaded members abuttable upon the follower whereby the follower and the top plate may be moved with respect to the bottom plate and means for forcing a liquid in reverse directions through the device.

6. In a fiber treating machine, in combination, a fiber chamber, a removable foraminous bottom plate comprising a series of spaced parallel bars within the fiber chamber, means for supporting the bottom plate, a removable foraminous top plate comprising a series of spaced parallel bars within the fiber chamber, a spider follower abuttable upon the top plate, a spider carrying a series of threaded members abuttable upon the follower whereby the follower and the top plate may be moved with respect to the bottom plate and means for forcing a liquid in reverse directions through the device.

7. In a fiber treating machine, in combination, a fiber chamber, a removable foraminous bottom plate within the fiber chamber, means for supporting the bottom plate, a removable foraminous top plate within the fiber chamber, means for supporting means capable of carrying hollow wound fibers, means for carrying hollow wound fibers, means for moving the top plate with respect to the bottom plate compressing fiber between the plates and means for passing a liquid in reverse directions through the device.

8. In a fiber treating machine, in combination, a fiber chamber, a removable foraminous bottom plate comprising a series of spaced parallel bars within the fiber chamber, means for supporting the bottom plate, a removable foraminous top plate comprising a series of spaced parallel bars within the fiber chamber, means for supporting means capable of carrying hollow wound fibers, means for carrying hollow wound fibers, means for moving the top plate with respect to the bottom plate compressing fiber between the plates and means for passing a liquid in reverse directions through the device.

9. In a fiber treating machine, in combination, a fiber chamber, a removable foraminous bottom plate within the fiber chamber, means for supporting the bottom plate, a removable foraminous top plate within the fiber chamber, means for supporting means capable of carrying hollow wound fibers, means for carrying hollow wound fibers, a spider carrying movable means abutting upon the top plate whereby the top plate may be moved with respect to the bottom plate and means for forcing a liquid in reverse directions through the device.

10. In a fiber treating machine, in combination, a fiber chamber, a removable foraminous bottom plate within the fiber chamber, means for supporting the bottom plate, a removable foraminous top plate within the fiber chamber, means for supporting means capable of carrying hollow wound fibers, means for carrying hollow wound fibers, a foraminous follower abuttable upon the top plate, a spider carrying movable means abuttable upon the follower whereby the top plate may be moved with respect to the bottom plate compressing fiber between the plates and means for forcing a liquid in reverse directions through the device.

11. In a fiber treating machine, in combination, a fiber chamber, a removable foraminous bottom plate comprising a series of spaced parallel bars within the fiber chamber, means for supporting the bottom plate, a revoluble foraminous top plate comprising a series of spaced parallel bars within the fiber chamber, means for supporting means capable of carrying hollow wound fibers, means for carrying hollow wound fibers, a foraminous follower abuttable upon the top plate, a spider carrying movable means abuttable upon the follower whereby the top plate may be moved with respect to the bottom plate compressing fiber between the plates and means for forcing a liquid in reverse directions through the device.

Signed at New York, in the county of New York and State of New York, this 30" day of November, 1918.

HOWARD M. DUDLEY.